United States Patent Office 3,058,882
Patented Oct. 16, 1962

3,058,882
N'-SUBSTITUTED-3-CARBOXY-6-HALO-SULFA-NILAMIDE AND DERIVATIVES THEREOF
Karl Stürm, Frankfurt am Main, Walter Siedel, Bad Soden (Taunus), and Rüdi Weyer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 14, 1960, Ser. No. 75,663
Claims priority, application Germany Dec. 28, 1959
7 Claims. (Cl. 167—51.5)

It is already known that benzene-sulfonamides of the formula

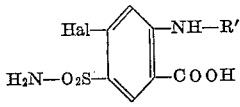

in which R' represents an alkyl radical of low molecular weight and "Hal" represents a halogen atom, can be prepared by sulfonation of corresponding halogeno-anthranilic acids or by sulfonation and subsequent oxidation of correspondingly halogenated o-toluidines (cf. Belgian Patent No. 574,891).

The substituted anthranilic acids used as starting substances for the first-mentioned process are difficultly obtainable in an industrial scale and their conversion into the desired final products requires several stages of reaction and results in moderate yields only. The last-mentioned known process shows considerable technical disadvantages since it can be realized only in several stages and since the yields obtained thereby do not reach 50% of the theoretical yields referred to the starting material used.

The present invention relates to a process of preparing benzene-sulfonamides of the Formula I

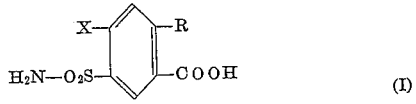

in which X represents a chlorine or bromine atom and R represents a benzylamino, dibenzylamino, furfurylamino or thenylamino group, and the salts thereof by reacting a compound of the Formula II

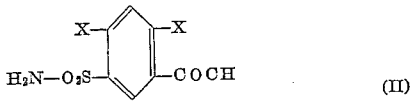

in which X has the meaning given above, with benzylamine, dibenzylamine, furfurylamine or thenylamine and, if desired, converting the condensation products obtained into the corresponding carboxylic acid salts by means of inorganic or organic bases.

As starting substances for the process according to the present invention there may be used preferably 3-sulfamyl-4,6-dichlorobenzoic acid, 3-sulfamyl-4,6-dibromo-benzoic acid and 3-sulfamyl-4-chloro-6-bromo-benzoic acid.

The starting substances are advantageously obtained by heating the corresponding 2,4-dihalogeno-benzoic acids for several hours with four to six times their amount in weight of chlorosulfonic acid to temperatures between 160 and 180° C., by pouring the cooled reaction mixture into ice water and by subsequent reaction of the crystalline 4,6-dihalogeno-benzoic acid-3-sulfonic acid chlorides thus obtained, with concentrated aqueous ammonia solution at room temperature. On acidifying the ammoniacal solution the desired starting substances already separate off in sufficiently pure state so that a further purification by recrystallization from ethanol/water in most cases can be dispensed with.

The reaction according to the invention of the dihalogeno-sulfamyl-benzoic acids thus obtained with the above-mentioned amines is suitably effected in such a way that the starting substances are heated to a temperature between 120 and 180° C., if necessary in the presence of inert organic solvents or diluents, it being of advantage to choose a two to four times excessive amount of the basic reaction component in order to bind the hydrogen halide set free in the reaction.

The reaction temperature depends to a high degree upon the type of the amine used. When using benzylamine it is favorable to apply a temperature between 130 and 150° C., when using furfurylamine and thenylamine the reaction mixture is advantageously heated to 135–145° C. and when using dibenzylamine the most favorable temperatures are those between 160 and 180° C.

Instead of an excessive amount of amine it is likewise possible to apply another usual basic agent, in order to capture the hydrogen halide set free in the course of the reaction, for instance alkali metal bicarbonates, calcium oxide or tertiary organic bases such as triethylamine, triethanolamine or dimethylaniline. It is surprising that the second halogen atom of the dihalogenated sulfamyl-benzoic acids, even when using a large excessive amount of the corresponding primary or secondary amine, does not participate in the reaction if the aforesaid temperatures are not considerably exceeded.

The reaction may be carried out in the melt as well as with the use of a solvent or diluent, for instance water or inert solvents miscible with water, such as ethanol, propanol, ethylene-glycol, ethylene-glycol-monomethylether or diethylene-glycol-dimethylether. According to the type of the starting materials used, the reaction mixture is heated for a shorter or longer period under reflux, if necessary in a closed vessel. The reaction is generally performed within 1–4 hours, the reaction period can, however, be prolonged to 12–24 hours when it is suitable to operate at a temperature as low as possible, in order to avoid side reactions. After the reaction is terminated, the reaction mixture is poured into dilute acid, whereupon the desired final product generally precipitates already in the form of crystals. The crude product can be purified by dissolving and reprecipitating it in normal sodium bicarbonate solution with hydrochloric acid and subsequent recrystallisation from an appropriate organic solvent miscible with water or a mixture of solvents such as ethanol, dimethylformamide/water or ethanol/water.

The products obtained according to the process of the present invention may, if desired, be converted into the corresponding carboxylic acid salts by treatment with mineral or organic bases. As such, there may be used ammonia, alkali metal carbonates or alkaline earth metal carbonates, alkali metal bicarbonates, alkaline earth metal bicarbonates, alkali metal hydroxides, alkaline earth metal hydroxides, alkali metal oxides and alkaline earth metal oxides. As organic bases there may be mentioned, for example, dicyclohexylamine.

With regard to the known state of the art it could not be expected that in the process according to the invention the selective exchange of an aromatically bound halogen atom for a substituted amino group would set in even in the presence of an excess of a base, and this was the more surprising since the reaction proceeds without using catalysts and often already at a moderately elevated temperature. It is likewise surprising that practically only one of the two aromatically bound halogen atoms, i.e. the halogen atom in ortho-position to the carboxy group, takes part in the reaction so that under the aforementioned reaction conditions there are obtained products that are considerably uniform.

The known processes mentioned in the first part of the description cannot be applied when compounds are to be prepared that are substituted at the nitrogen atom by a benzyl, furfuryl, or thenyl radical, since these radicals are likewise sulfonated in the reaction with chlorosulfonic acid or are oxidized during the oxidization with permanganate.

The new products obtained according to the process of the invention exhibit valuable therapeutic properties. They are particularly suitable as diuretics and saluretics. In animal experiments they particularly cause the secretion of sodium and chlorine ions in approximately equivalent proportions, whereas the secretion of potassium is increased to a small extent only. By reason of this sodium-uretic efficacy the products obtained according to the process of the invention neither cause an acidosis nor an alkalosis of the cellular tissue and are, likewise owing to their excellent compatibility, particularly suitable, for example, for the therapy of oedema or, in combination with other hypotensively active compounds, they are suitable, for example, for the permanent therapy of essential hypertonia.

The compounds are active in their free form as well as in the form of their salts in oral as well as in parenteral administration. Therefore, they can be used as such or in admixture with suitable pharmaceutically usual carriers in solid or liquid form, for example, water, vegetable oils, starch, lactose, talcum or with auxiliary agents, for example, stabilizers, preserving, wetting or emulsifying agents. The products can be applied in the form of tablets, dragées, capsules, solutions, suspensions or emulsions. With particular advantage the compounds are orally applied in the form of tablets or dragées. For the therapy of human beings, there enter into consideration dosages in the range of 0.01 gram and 0.2 gram of the new products.

For the purpose of comparison the following table shows the diuretic and saluretic values obtained by testing the new compounds, i.e. 3-sulfamyl-4-chloro-6-benzyl-amino-benzoic acid (I) and 3-sulfamyl-4-chloro-6-furfurylamino-benzoic acid (II) in contradistinction to the corresponding pharmacological data of the known product 6-chloro-7-sulfamyl-3,4-dihydro-1,2,4-benzothiadiazine-1,1-dioxide (III).

TABLE

| Test preparation | I | | II | | III | |
|---|---|---|---|---|---|---|
| Dosage/per os | 25 mg./kg. | 50 mg./kg. | 25 mg./kg. | 50 mg./kg. | 25 mg./kg. | 50 mg./kg. |
| Lipschitz value L (T/U) | 2.4 | 3.9 | 3.2 | 4.9 | 1.3 | 1.7 |
| Saluresis: | | | | | | |
| T/U (Na) | 2.7 | 3.3 | 3.1 | 3.1 | 1.4 | 1.5 |
| T/U (K) | 1.1 | 1.6 | 1.3 | 1.6 | 1.1 | 1.3 |
| T/U (Cl) | 2.5 | 3.2 | 3.0 | 3.0 | 1.5 | 1.6 |
| $\frac{(Cl)^-}{(Na)^+ + (K)^+}$ | 0.98 | 1.00 | 1.03 | 0.98 | 0.85 | 0.83 |

Elucidations regarding the above table: When determining the Lipschitz value $T/U$ the diuresis of a control group of rats to which, prior to the beginning of the test, urea was orally applied, was referred to the excretion of urine taking place upon application of the substance to be tested (T), in such a way that from the individual 5 hours' values (cc.) a quotient $T/U$ was formed.

The secretion of water (diuresis) was tested on rats of an average weight of about 100 grams each. The rats were not given any food nor drinking water for 24 hours prior to the starting of the test; they were divided into groups of 3 animals each having about the same body weight. The animals were given the test preparation by means of an esophageal sound in a dosage of 25 or 50 milligrams/kilogram, suspended in a starch solution of 2% strength (0.5 cc.). Each test animal was then orally given 5 cc. of sodium chloride solution of 0.9% strength per 100 grams of body weight. The test animals were then placed into diuresis funnels. The quantity of urine excreted by each group of animals was hourly determined for 5 hours, in the measuring cylinder. During the examination of each test preparation a group of animals treated with urea (1 g./kg.) was simultaneously examined. Moreover, a comparison test with a known standard preparation was simultaneously carried out and there was likewise effected a control by means of sodium chloride (5 cc./100 grams of rat). All tests were carried out with double determination.

The total quantity of urine excreted by each group within the observation period of 5 hours was referred to 100 grams of body weight of the animals and the arithmetical mean was formed. The quotient from the test group of the individual preparation (T) and the urea group (U) consistutes the Lipschitz value designated by L, L equally $T/U$.

A test preparation may be considered an efficacious diuretic if, for instance, 25 milligrams of the substance result in a Lipschitz factor of lower than 1.

When testing the saluretic efficacy likewise rats of about 100 grams of body weight were use as test animals. These animals were not fed for 24 hours prior to the beginning of the test but received drinking water. The animals were divided in groups of 3 animals each showing nearly uniform weight. The test preparation as well as the known standard substance and the urea (1 gram/kilogram) were applied in the form of a suspension (0.5 cc.) in a starch solution by means of an esophageal sound. Three animals each were placed into the diuresis funnel (double control). The urine excretion was measured in the first five hours, the urine quantity of each group was collected and the amount of sodium-, potassium- and chlorine-ions contained therein was determined.

The saluretic efficiency of the test preparations was ascertained by determining Na and K (flame-photometrically) and Cl (argentometrically with potentiometric determination of the final point). From the result of the analysis the excretion was calculated in millimols/kilogram for each ion. These values were designated by $(Na)^+$, $(K)^+$ and $(Cl)^-$.

The excretion of ions (millimols/kilogram) after application of the test substance (T) was referred to the saluresis caused by urea (U). In this manner, there were obtained likewise for the excretion of sodium-, potassium- and chlorine ions $T/U$ values which were designated by $T/U$ (Na), $T/U$ (K) and $T/U$ (Cl).

The quotient $$\frac{(Cl)^-}{(Na)^+ + (K)^+}$$

shows the degree of efficiency. With a good saluretic agent the quotient should reach a value possibly near to 1, i.e. it should provoke the excretion of a great number of sodium and chlorine ions and of a small number of potassium ions.

It results from the values given in the table that the new compounds are considerably superior to the known preparation (III) as regards diuretic as well as saluretic efficacy.

The following examples serve to illustrate the invention but they are not intended to limit it thereto:

*Example 1*

3-SULFAMYL-4-CHLORO-6-BENZYLAMINO-BENZOIC ACID (a) A solution of 27 grams of 3-sulfamyl-4,6-dichloro-benzoic acid melting at 233–235° C. in 42 cc. of benzyl-amine and 50 cc. of ethyleneglycol-monomethyl-ether are heated for 4 hours under reflux and then stirred into 600 cc. of 2 N-hydrochloric acid. 26 grams of light-yellow crystals separate off melting at 232–235° C. with decomposition. From ethanol of 96% strength (with addition of coal) the 3-sulfamyl-4-chloro-6-benzylamino-benzoic acid crystallizes in the form of colorless prisms melting at 244.5° C. with decomposition.

(b) Dicyclohexylammonium salt of 3-sulfamyl-4-chloro-6-benzylamino-benzoic acid: 6.8 grams of 3-sulfamyl-4-chloro-6-benzylamino-benzoic acid and 3.6 grams of dicyclohexylamine are dissolved in 80 cc. of ethanol and 100 cc. of water are added to the clear mixture. On trituration, the salt starts crystallizing. After standing for one day at 0° C. it is filtered off with suction and precipitated from a mixture of acetone and water (1:2). 7.5 grams of colorless prisms are obtained melting at 209–210° C.

(c) Magnesium salt of 3-sulfamyl-4-chloro-6-benzyl-amino-benzoic acid: 100 cc. of water are added to 0.6 gram of finely pulverized magnesium oxide and 6.7 grams of 3-sulfamyl-4-chloro-6-benzyl-amino-benzoic acid, and the whole is heated for 20 minutes under reflux. After cooling to room temperature, any undissolved matter is filtered off and the filtrate is lyophilized. 6.9 grams of the product are obtained in the form of an amorphous, non-hygroscopic powder which is easily soluble in water.

*Example 2*

3-SULFAMYL-4-CHLORO-6-FURFURYLAMINO-BENZOIC ACID 10.8 grams of 3-sulfamyl-4.6-dichlorobenzoic acid (0.04 mol) and 11.7 grams of furfurylamine (0.12 mol) are heated in 30 cc. of diethyleneglycol-dimethylether for 6 hours under reflux. When pouring the reaction mixture into 300 cc. of 1 N-hydrochloric acid, the reaction product is immediately separated off in the form of crystals. The light-yellow crude product is purified by dissolving it in 100 cc. of warm 1 N-sodium bicarbonate solution, precipitation by means of hydrochloric acid and subsequent recrystallization from ethanol/water, with addition of charcoal. Colorless prisms are obtained which decompose at 206° C. while adopting a brown coloration, and with evolution of gas.

*Example 3*

3-SULFAMYL-4-CHLORO-6-(2-THENYLAMINO)-BENZOIC ACID 10.8 grams of 3-sulfamyl-4.6-dichlorobenzoic acid are reacted with 15.8 grams of thenylamine (0.14 mol) as described in Example 2 and the reaction product is purified as already indicated. The product according to the invention forms colorless prisms which decompose at 201° C. with evolution of gas and while adopting a dark coloration.

*Example 4*

3-SULFAMYL-4-CHLORO-6-DIBENZYLAMINO-BENZOIC ACID

A mixture of 10.8 grams of 3-sulfamyl-4.6-dichlorobenzoic acid (0.04 mol), 27.6 grams of dibenzylamine (0.14 mol) and 50 cc. of ethylene-glycol is heated for 3 hours to 170° C. and then poured into 300 cc. of normal sulfuric acid. After standing for several hours the precipitate is filtered off with suction, dissolved in 100 cc. of 2 N-sodium hydroxide solution, the solution is extracted with ether and decolorized in the heat by means of charcoal.

The reaction product separated off on acidification with hydrochloric acid, is recrystallized from ethanol and forms colorless prisms melting at 206° C. with decomposition.

*Example 5*

3-SULFAMYL-4-BROMO-6-BENZYLAMINO-BENZOIC ACID

A mixture of 10.8 grams of 3-sulfamyl-4.6-dibromobenzoic acid (0.03 mol) melting at 242–243° C., 13.0 grams of benzylamine (0.12 mol) and 25 cc. of ethyleneglycol-monomethyl ether are heated for 3 hours under reflux and then stirred into 500 cc. of normal hydrochloric acid. The reaction product separated off in the form of a light-yellow resin, is freed from resinous by-products by dissolution in 100 cc. of 1 N-sodium-bicarbonate solution and is separated off in the form of crystals by means of concentrated hydrochloric acid. After recrystallization from ethanol the compound melts at 247° C. with decomposition.

We claim:
1. Benzene-sulfonamides having the formula

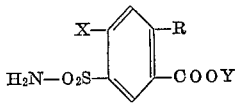

wherein X is a member of the group consisting of chlorine and bromine, R is a member of the group consisting of benzylamino, dibenzylamino, furfurylamino and 2-thenylamino, and Y is a member of the group consisting of hydrogen, an alkali metal, an alkaline earth metal, ammonium and dicyclohexylammonium.

2. The 3-sulfamyl-4-chloro-6-benzylamino-benzoic acid.
3. The 3-sulfamyl-4-chloro-6-furfurylamino-benzoic acid.
4. The 3-sulfamyl-4-chloro-6-(2-thenylamino)-benzoic acid.
5. The 3-sulfamyl-4-bromo-6-benzylamino-benzoic acid.
6. The 3-sulfamyl-4-chloro-6-dibenzylamino-benzoic acid.
7. A tablet consisting essentially of (1) about 0.01 to 0.2 gram of a benzene-sulfonamide having the formula

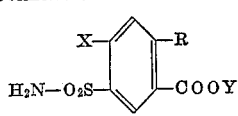

wherein X is a member of the group consisting of chlorine and bromine, R is a member of the group consisting of benzylamino, dibenzylamino, furfurylamino and 2-thenylamino, and Y is a member of the group consisting of hydrogen, an alkali metal, an alkaline earth metal, ammonium and dicyclohexylammonium and (2) a pharmaceutical diluent.

References Cited in the file of this patent

UNITED STATES PATENTS

| | | |
|---|---|---|
| 2,910,488 | Novello | Oct. 27, 1959 |
| 2,952,680 | Novello | Sept. 13, 1960 |